United States Patent
Kuppuswamy et al.

(10) Patent No.: US 8,095,372 B2
(45) Date of Patent: Jan. 10, 2012

(54) DIGITAL PROCESS AND ARRANGEMENT FOR AUTHENTICATING A USER OF A DATABASE

(75) Inventors: Raja Kuppuswamy, Munich (DE); Hermann Geupel, Munich (DE)

(73) Assignee: VOICECASH IP GmbH, Zurich (CH)

( * ) Notice: Subject to any disclaimer, the term of this patent is extended or adjusted under 35 U.S.C. 154(b) by 1039 days.

(21) Appl. No.: 11/970,067

(22) Filed: Jan. 7, 2008

(65) Prior Publication Data

US 2008/0281600 A1 Nov. 13, 2008

(30) Foreign Application Priority Data

May 9, 2007 (DE) .......................... 10 2007 021 772

(51) Int. Cl.
*G10L 21/00* (2006.01)

(52) U.S. Cl. ...................... 704/275; 704/246; 704/270.1; 704/243; 704/257; 379/88.02; 379/88.13; 379/88.03; 379/93.24; 455/563; 381/110; 726/7

(58) Field of Classification Search .................. 704/275, 704/246, 251, 270, 270.1, 243, 257; 379/88.02, 379/88.13, 88.01, 88.03, 93.03, 88.23, 93.24; 455/563; 381/110; 726/7

See application file for complete search history.

(56) References Cited

U.S. PATENT DOCUMENTS

| | | | |
|---|---|---|---|
| 7,064,652 B2 * | 6/2006 | Junqua et al. | 340/5.84 |
| 7,590,538 B2 * | 9/2009 | St. John | 704/246 |
| 2002/0002464 A1 * | 1/2002 | Petrushin | 704/275 |
| 2002/0010857 A1 * | 1/2002 | Karthik | 713/168 |
| 2007/0005206 A1 * | 1/2007 | Zhang et al. | 701/36 |
| 2007/0061590 A1 * | 3/2007 | Boye et al. | 713/186 |
| 2009/0025071 A1 * | 1/2009 | Mumm et al. | 726/7 |

FOREIGN PATENT DOCUMENTS

| | | |
|---|---|---|
| EP | 0761514 | 3/1997 |
| EP | 0856836 | 8/1998 |
| EP | 1343121 | 9/2003 |
| EP | 1675070 | 6/2006 |
| EP | 1843325 | 10/2007 |
| EP | 1860647 | 11/2007 |
| WO | 2004061818 | 7/2004 |

* cited by examiner

*Primary Examiner* — Vijay B Chawan
(74) *Attorney, Agent, or Firm* — Volpe and Koenig, P.C.

(57) ABSTRACT

Digital process for authentication of a user of a database for access to protected data or a service reserved for a defined circle of users or for the use of data currently entered by the user, wherein a voice sample currently enunciated during an access attempt by the user is routed to a voice analysis unit and, herein, a current voice profile is computed and this is compared in a voice profile comparison unit against a previously stored initial voice profile and, in response to a positive comparison result, the user is authenticated and a first control signal enabling access, but in response to a negative comparison result a second control signal disabling access or triggering a substitute authentication procedure is generated.

18 Claims, 3 Drawing Sheets

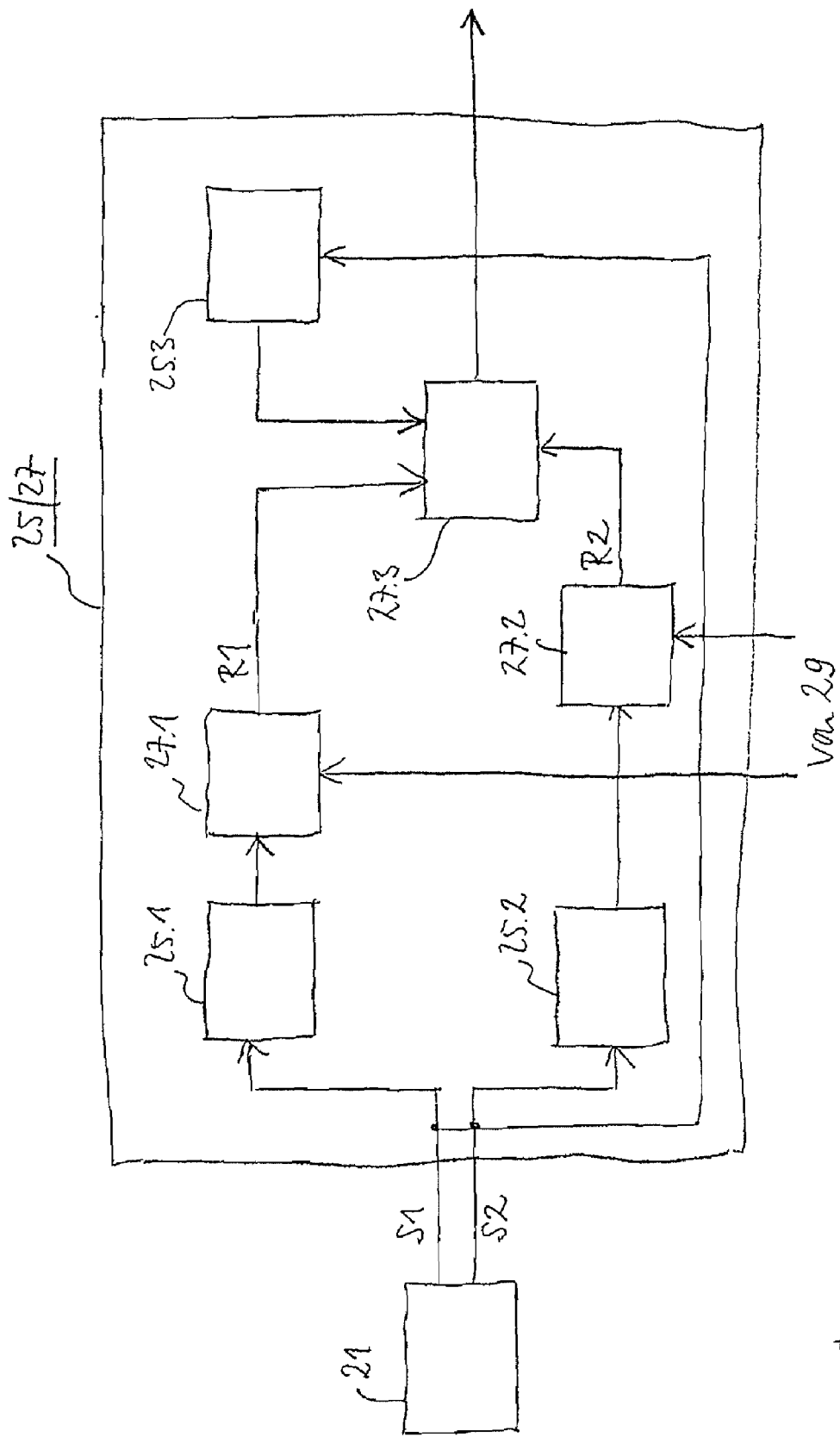

DIGITAL PROCESS AND ARRANGEMENT FOR AUTHENTICATING A USER OF A DATABASE

BACKGROUND

The invention concerns a digital process for authenticating a user of a database and a configuration (arrangement) for implementing this process.

Since it has been possible to operate telecommunications and data terminal devices as mobile telephones and portable computers with mobile radio or a WLAN interface, for many purposes and in relation to diverse criteria authentication of the actual user has become even more important than before. This is particularly virulent in connection with access to financial resources of an actual or potential user, but also in relation to access to services or protected datasets that are not freely available.

With the development of telephone and electronic home banking and with the creation of Internet trading platforms, even years ago this problem led to extensive development efforts and also certainly marketable solutions that are commonly available on the market. In the case of telephone banking, common authentication solutions are based on a PIN and possibly additional querying of user-specific information, while current electronic home banking solutions make use not only of a PIN, but also generally of additional transaction codes or numbers (TANs) that the operator assigns to each user and which the user then uses during a transaction.

Unfortunately, some of the known and established processes call for relatively large amounts of organization and costs on the part of the provider and are subject to only limited acceptance on the part of the user due to the necessary operating effort involved. Moreover, the relatively simple authentication solutions in the case of telephone home banking can only be classified to a very limited extent as being secure.

The operators of data systems that require protection, in particular account systems used in masses (for example banks and Internet trading platforms), are therefore increasingly using biometrics-based authentication solutions that are based on unique, unmistakeable biometric features of the user. Especially in the case of systems involving telephone access—including those relating to VoIP-based access—in particular also the use of the idiosyncrasies of the human voice are considered as a biometric feature, and there are substantial development endeavours in this respect.

In the course of the introduction and conception of voice biometrics processes, the respective service provider, for example a bank, is faced with the dilemma that, on the one hand, the process must reliably check the user and, on the other hand, must also be acceptable for the user. A distinction is made between the login process, also referred to as enrolment, and the checking process, also referred to as authentication. Within the scope of enrolment, in a telephone call a few seconds of the user's talking time are recorded and a voice profile is generated on its basis. Within the scope of authentication, an up-to-date voice recording of the user is compared against a once generated voice profile.

Two kinds of voice checking methods are obtainable on the market, the text-dependent and the text-independent methods. Within the scope of the text-dependent method, the user authenticates himself or herself by repeating the same term he or she has "trained" during enrolment by repeating it several times for the system. Within the scope of the text-independent method, the user is not tied to a specific term, but is identified by saying any text. In comparison with the text-independent method, the text-dependent method tends to have the advantage that, during both enrolment and authentication, less voice material is required from the user for a specific recognition rate, and it has the disadvantage that repeating certain terms can appear to the user to be artificial. In the case of both methods, there is the possibility of the so-called passive enrolment, where the use speaks normally, leaving behind the suitable voice material for generation of the voice profile.

In the case of the text-dependent method, the corresponding restrictions consist of the fact that the user must undergo the same dialogue flow in several calls. In the case of the text-independent method, the restriction consists of the fact that, in certain circumstances, the user must wait for several telephone calls to have taken place before sufficient amounts of voice material, for example 30 to 90 seconds of spoken text, have been gathered for the voice profile.

In the case of the so-called active enrolment, the user is guided by a dialog until the voice material required for enrolment has been stored. In comparison with active enrolment, the advantage of passive enrolment is that it produces less effort for the user, and the disadvantage is that it can extend for several calls by the user. Therefore, at the start of use of the system, it will already be fed with voice material, but it will not yet perform any authentication or at least not independently. This is not so satisfactory for the user or the operator because substitute authentication solutions and/or considerable reductions in security have to be tolerated for this period of time, which naturally substantially increases effort in total and significantly impairs user acceptance.

SUMMARY

The invention is based on providing an improved process and an improved apparatus of the aforementioned kind which are distinguished in particular by a combination of user-friendliness (and hence the required user acceptance) and an adequate security standard.

In relation to its process aspect, this problem is solved by a process according to the invention and, in relation to its apparatus aspect, by an arrangement according to the invention. Expedient enhancements of the invention's concept are the subject of the pending claims.

The invention is based on the fundamental idea of using, to solve the problem explained above, the biometric feature of the voice's idiosyncrasy or the voice profile, which is particularly suitable for telecommunications and VoIP technologies, wherein a voice sample supplied by the user within the scope of an access attempt is fed to a voice analysis unit and, in this, an attempt is made to define a current voice profile. The invention also includes the idea of practising a combination of text-dependent and text-independent verification. Within the scope of this, in particular variable weighting of the text-dependent and the text-independent components can be provided for, and in a further variant of the invention especially depending on a "history" of the previous feeding of the system with voice samples from the respective user, i.e. the achieved degree of definedness of his or her voice profile and reliability of verifications based on it.

This is in particular realised as follows:

The process of active, text-dependent enrolment is linked with the process of passive, text-independent enrolment. Authentication takes place analogously actively, text-dependently and passively, text-independently. This means, for example, that the voice biometry system guides the user once through a brief enrolment dialog to generate the text-dependent voice profile or profiles and gathers all further enunciations of the user for the generation of a text-independent voice profile. In further calls, in which the user authenticates himself or herself with his or her voice, he or she is prompted by an authentication dialog to say the terms matching the text-dependent voice profiles. Further recorded enunciations of the user are compared against the text-independent voice profile.

If this is successful with sufficient reliability due to the quality of the voice sample enunciated, the voice sample will serve to authenticate the user and, if the result of authentication is positive, the attempted access will be granted. In the event that authentication should fail due to the voice sample supplied (due to insufficient quality or inadequate reliability of the voice profile evaluation), several options are possible within the scope of the process proposed, wherein the choice of the security level granted will above all depend on further constraints such as defined user prompting conditions. In particular, in this case a substitute authentication procedure is started that makes use of an additional means of authentication.

In an ingenious combination with the use of text-dependent enrolment and verification elements provided for in compliance with the invention, names, terms, digit strings or similar, for example, can be used for this purpose that have a reference to the biography and circumstances of the user and, insofar as this is concerned, represent highly individualised data. If such means of authentication are recorded during registration of the user (certainly during enrolment, for example), later on during authentication processes they can temporarily substitute the voice profile as an effective means of authentication or they can be used to boost authentication security. One advantage for system design consists of the fact that an associated input request to the user can be relatively unspecific (for example: "Say your mother's first name"), but nevertheless leads to a highly specific input (enunciation).

As an important application, it is planned for transaction data to be entered "live" via a user or system terminal device and for its use for triggering a payment transaction or similar to be controlled by enablement of access. Although this involves more operation effort for the user in each individual case than recourse to previously stored transaction data, this may boost acceptance of the process in the case of users who are particularly sensitive to storage of important personal data (such as financial transaction data) in databases.

A further important application is when access concerns an e-mail account or an individualised Internet portal. Finally, it is possible to provide for cases in which access concerns a protected memory area where personal documents of the user are stored. These latter mentioned application cases therefore concern access to protected personal data of a user. Ultimately, with the method proposed, authentication can also take place for authorised access to services of a service provider that are not freely available.

In the interests of high user acceptance and also to avoid organisational problems on the part of the provider of a corresponding service, the proposed process is preferably combined, as already mentioned above, with a substitute authentication procedure. To this end, in particular the input of at least one user-specific word, a short text, a PIN or a code word or password or similar and comparison with a previously stored reference is provided for. This procedure follows the idea that, especially in transactions with security requirements that are not all that high, it is a priority to also actually enable access for the user with the automated process when the user attempts access, even if his or her voice profile has not yet been reliably established. This was specially conceived so that, during a first attempt, an enabling control signal is generated in a simplifying way as a response to entry of the individual word or text segment or the PIN, etc.

However, to be able to trust in the performance of voice profile authentication along or at least primarily, the first voice sample is typically used for a registration (enrolment). Then, the process can be designed so that the user is repeatedly asked to provide a voice sample until a voice profile is actually determined on the basis of one or several of the enunciated voice samples and it has been possible to store it, and only then is access granted to the user. Although this variant may initially lead to irritation on the part of users if computation of the voice profile is not immediately successful with his or her first voice sample, it ensures the availability of an initial voice profile for subsequent authentication events.

Within the scope of the proposed process, it is initially possible to use voice samples chosen by the user for voice analysis, for example, the user's own name enunciated by the user or a password, etc. However, a higher probability that the voice sample will be useful for voice profile computation is achieved if voice samples are stipulated to the user that have been assessed in relation to phonematic criteria and have proven themselves. Then, within the scope of user prompting, the or every voice sample to be enunciated is displayed or spoken to the user and he or she is optionally asked to enter a PIN or a code word or similar.

Variants of the process according to the invention largely transpire from the process aspects explained above and therefore do not require any further explanation here. It is pointed out, however, that the core of a corresponding arrangement is typically a system server that functionally interacts with external databases and possibly a data management server belonging to them. In particular, it is then planned for the system server to be in a protected connection, during and/or directly after completion of the authentication procedure, with a control input of a data management server on which protected data or documents are stored, or with a control input of a service server through which the services reserved for a defined circle of users can be accessed or generated.

Essential components of the system server are a voice sample input interface, a voice analysis unit, a voice profile storage unit and a voice profile comparator unit connected to both and, according to the invention above all—assigned to the voice profile comparator unit—an assessment and decision-making stage for combining the text-dependent and text-independent components or intermediate results of voice profile verification and for generation of the relevant output control signal depending on the result of the assessment and decision-making process.

In a preferred embodiment that enables the realization of the substitute authentication procedure mentioned above, the system server also includes a text evaluation unit for evaluation of text entered by the user, a PIN or similar, a text storage unit for storage of text or a PIN, etc. and a PIN comparator unit for comparison of the currently entered text with stored text, a PIN, etc. and for output of the enabling or disabling control signal depending on the comparison result. Here, the user prompting unit for realization of visual and/or audible user prompting is in particular such that the user is asked for voice samples and can be asked to enter a PIN, a code word, etc. on his or her terminal device.

BRIEF DESCRIPTION OF THE DRAWINGS

Advantages and practicalities of the invention otherwise result from the following description of a preferred variant example with reference to the figures. Of these:

FIG. 3 shows a sketch-like representation of a variant according to the invention of the components of the arrangement shown in FIG. 1 or 2 that perform voice profile calculation and voice profile comparison.

DETAILED DESCRIPTION OF THE PREFERRED EMBODIMENTS

Figure 1:
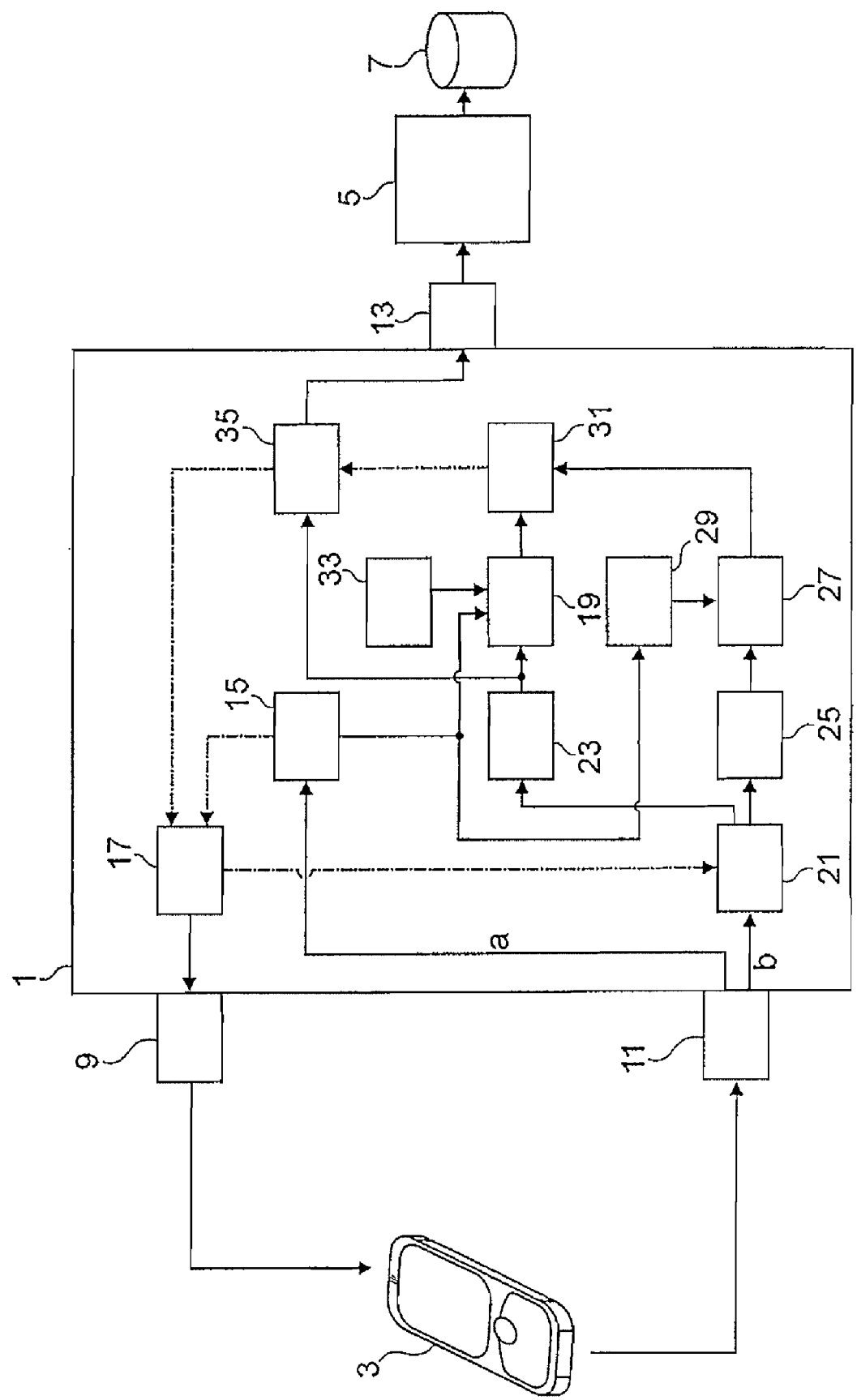
FIG. 1 shows a schematic depiction of a first example of the arrangement according to the invention as a function block diagram.

FIG. 1 schematically shows the structure of an embodiment of the arrangement according to the invention, with a system server 1 (which, in this connection, can also be referred to in relation to its main function as the authentication server) as the linking element between a mobile telephony terminal device 3 of a user and a data management server 5 of a database 7. The data management service 5 is not specified in any further detail below; here, it generally stands for any kind of functionality with which access to data or services administered in the system, also in conjunction with financial transactions, can be enabled for a user of a mobile telephone. With regard to the signal connections shown, the depiction is based on the assumption that the system server is in the authentication mode.

The system server 1 has a user prompting output interface 9, a user input interface 11 (which simultaneously acts as a voice sample input interface) for temporary connection to the mobile telephone 3 of the user and a control signal output interface 13 for connection to the data management server 5 for the output of control signals to it.

According to the functional structure (shown in a simplified form in the figure for improved clarity) of the system server 1, the user input interface 11 is simultaneously designed as an input signal branch which permits feeding of input signals (for example the MSISDN) transmitted automatically by the mobile telephone 3 to subsequent processing units over a first signal path a and of voice inputs of the user to subsequent components via a second signal path b. The signal path a leads to a mobile number recognition unit 15 that issues a control signal to a user prompting unit 17 in response to acquisition of the user's mobile radio telephone number. This realizes all user prompting during enrolment or authentication processes executed with the system presented and outputs corresponding elements of user prompting through the user prompting output interface 9. The acquired MSISDN is also supplied by the mobile number recognition unit 15 to a user data processing stage 19 which, in total, is designed for input-end processing of all manner of user data. There, it is initially only buffered for later processing.

An internal control signal output in response to receipt of the MSISDN and in parallel with the output of a user prompt providing guidance through the further procedure by the user prompting unit 17 reaches a voice input switching unit 21, which permits internal processing of voice inputs in the system server 1 made by the user on his or her mobile telephone 3 and routed into the signal path b via the user input interface 11.

The voice input switching unit 21 also forms a signal branching point from where a received voice input is routed on the one hand to a voice recognition unit 23 for evaluation of the content of the voice input and, on the other hand to a voice profile computing unit 25. Depending on the specific control state of the voice input switching unit 21, alternative or parallel forwarding of a received voice sample to the alternative or parallel content evaluation of voice analysis is possible.

A voice profile successfully computed by the voice profile computing unit 25 is routed to a voice profile comparison unit 27, where it is subjected to a comparison with a previously stored voice profile of the same unit, which is loaded for this purpose out of a voiced profile storage unit 29. Corresponding addressing of the voice profile storage unit 29 is ensured via the output signal of the mobile number recognition unit 15, which supplies the relevant indicator for the user's identity. If conformity transpires from the comparison of the voice profiles in the comparison unit 27 to an adequate degree of reliability, this unit outputs a corresponding confirmation signal to a first input of an OR stage 31.

The voice recognition unit 23 acquires relevant user information from the same or another voice sample (see further below, with reference to FIGS. 2A to 2E) and routes it to the user data processing stage 19. This consists of user data received in this way of directly from the mobile number recognition unit 15 with the comparison data stored in the user data storage unit 33 and can (besides other functions which have been omitted in the simplified functionality presented here) output a confirmation signal to a second input of the OR stage 31 as a result of the comparison.

Furthermore, user inputs processed by voice recognition in the voice recognition unit 23 (for example, a required access address of a memory area spoken in plain language, the designation of a service retrieved by the user or the designation of a service retrieved by the user) can be routed to the input of a user input switch-through stage 35. The user input switch-through stage 35 is connected via a control input to the output of the OR stage 31, which sets is to a user input switch-through state provided a positive confirmation signal is present at at least one of its inputs that identifies successful authentication of the user via his or her voice profile or via other inputs (i.e. in a substitute authentication procedure). In this case the user input present at the input end is routed into the control signal output interface 13 and ultimately leads to access enabling in the database 7 via the data management server 5 (or to the execution of a comparable operation, for example the provision of a required service or the execution of a required transaction due to transaction data stored in the database 7).

At the same time, a control signal indicating switching through of the user inputs is sent to the user prompting unit 17, which outputs corresponding confirmation information for display/output on the mobile telephone 3.

Experts can derive details of the special processes for specific application scenarios easily from the description above. It must be noted that the voice profile computation and voice recognition for the purpose of substitute authentication shown as parallel processing in a simplified form in FIG. 1 can be conditionally combined so that the acquisition of a confirmation signal for user access to the database is first attempted on the basis of his or her voice profile and a substitute procedure is only stated if this authentication attempt should fail. Naturally, in such a realization, the signal combinations between the individual processing units, the user input switch-through stage and the user prompting unit are correspondingly more complex and time-dependent.

Figure 2:
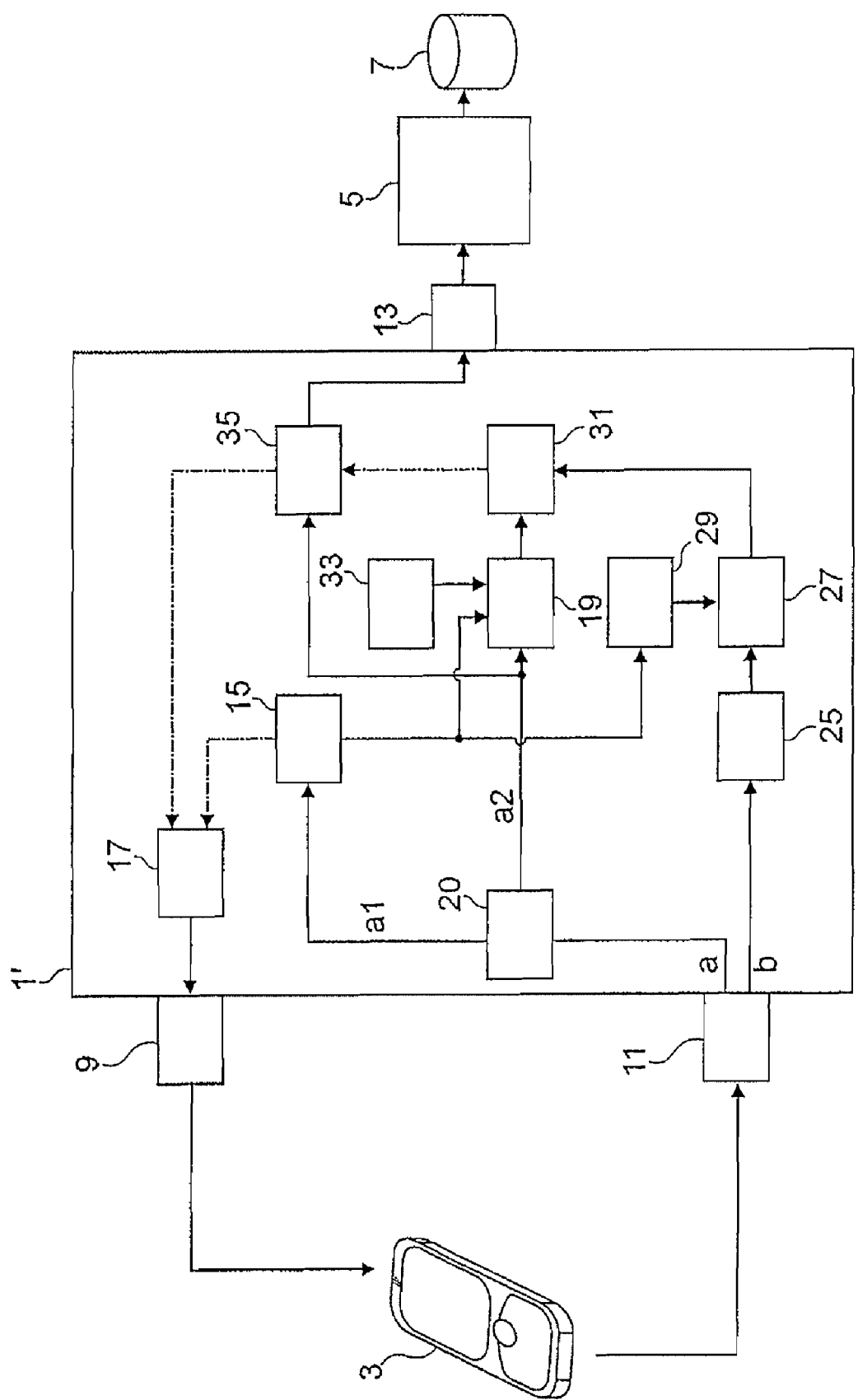
FIG. 2 shows a schematic depiction of a second example of the arrangement according to the invention as a function block diagram.

FIG. 2 shows a variant of the arrangement shown in FIG. 1 which differs from it by virtue of a different kind of inputs and the signal processing within the scope of the substitute authentication procedure. However, the structure of the arrangement 1' as shown in FIG. 2 largely agrees with that of the arrangement 1 shown in FIG. 1; the agreeing components are identified with the same reference numbers and are not explained once again here.

The essential difference consists of the fact that, here, voice inputs are used exclusively for voice profile-based authentication of the user and can therefore be routed directly (along signal path b) to the voice profile computation unit 25. Along the signal path a, both records generated automatically by the mobile telephone 3 (for example the MSISDN) and also records from inputs made by the user on the telephone keypad (for example, a PIN or a password, etc.) reach a digital input classification stage 20. This routes records generated automatically in the telephone along a first partial signal path a1 to the mobile number recognition stage 15, while data entered digitally by the user is routed over a second partial signal path a2 directly to the user data processing stage 19 and in parallel to the user input switch-through stage 35. The processing taking place in these components again corresponds to the processing in the first embodiment.

FIG. 3 schematically sketches a possible basic configuration for the realisation of a combined text-dependent and text-independent voice profile verification in a (shown in a summarising form here in contrast to FIGS. 1 and 2) voice profile calculation/comparator unit 25/27:

In this representation, it is presumed that the previously connected voice input switching unit also performs, in it function as signal branching point already described further above, "routing" of voice samples S1 generated text-dependently, on the one hand, and voice samples S2 generated text-independently on the other hand. These are routed to a first or second sub-processing stage 25.1 or 25.2, the outputs of which are connected to a first or second sub-comparator unit 27.1 or 27.2, which are each connected via second inputs to the voice profile storage unit 29 (not shown here). At their outputs, intermediate results R1 or R2 of the text-dependent or text-independent voice profile verification are available that are fed to an assessment and decision-making stage 27.3 where the intermediate results are processes to arrive at an overall verification result and the corresponding first or second control signal is output.

The assessment and decision-making stage 27.3 is connected via an additional data input to a sample size acquisition unit 25.3 whose input is connected directly to the voice input switching unit 21 and registers the scope of the voice samples forwarded to there for voice profile evaluation only during the enrolment phases. As mentioned further above, the voice sample scope is incorporated in the processing procedure in the assessment and decision-making stage 27.3 as a parameter.

The voice biometry system (or process) according to the invention that guides the user through the enrolment and authentication dialogue can manage completely without so-called voice recognition, i.e. translation of the voice input to text. Thus, the system (or process) becomes stable in relation to dialects spoken by users and can easily be used in different languages worldwide because only the announcement texts are translated and not voice recognition grammars need to be created and maintained. When voice recognition is active and in the absence of language recognition, a knowledge check (see points 2 and 3 above) used within the scope of active, text-dependent authentication acts such that the caller's audio pattern matches the user's text-dependent voice profile only when he or she answers with the same term that the user enunciated during enrolment.

Realisation of the invention is not limited to the example apparatus presented and described above and the example process described above, but is also possible in a large number of variants that that lie within the scope of technical action. The general description part refers to essential other applications and variants.

The invention claimed is:

1. A digital process for authentication of a user of a database for access to protected data or a service reserved for a defined circle of users or for the use of data currently entered by the user, comprising routing a voice sample currently enunciated during an access attempt by the user to a voice analysis unit, computing a current voice profile and comparing the current voice profile in a voice profile comparison unit against a previously stored initial voice profile and, in response to a positive comparison result, authenticating the user and enabling access with a first control signal, but in response to a negative comparison result disabling access with a second control signal or triggering the generating of a substitute authentication procedure, and during authentication carrying out a text-dependent verification and a text-independent verification of the voice profile and combining results of both verification processes with one another in an assessment and decision-making step, and generating the first or second control signal as a result of this step.

2. The process according to claim 1, further comprising entering transaction data via a terminal device used for recording a voice sample and, through enabling of access, controlling its use for triggering a payment transaction.

3. The process according to claim 1, wherein the access relates to data of a bank or credit card account or any other credit balance relevant to a transaction.

4. The process according to claim 1, wherein the access relates to an e-mail account or an individualised Internet portal.

5. The process according to claim 1, wherein access relates to a protected database in which personal documents of a user are stored.

6. The process according to claim 1, further comprising carrying out authentication processing on an authentication server that sends the first or second control signal through a protected control signal connection to a separate data management server.

7. The process according to claim 1, further comprising one step including enunciating user-specific text in response to an output of an enunciation prompt that is not user-specific.

8. The process according to claim 1, wherein selected text is stipulated for enunciation in an authentication operation as has been used to determine the initial voice profile.

9. The process according to claim 1, further comprising the substitute authentication procedure including inputting of user-specific text, a PIN or a code word or similar identifier, and comparing the input with a previously stored text, a PIN or a code word or similar identifier, wherein the first control signal is generated only in response to a positive comparison result.

10. The process according to claim 9, further comprising for the first time an access attempt is made, generating the first control signal in a simplified way in response to input of the user-specific text, the PIN or the code word or similar identifier.

11. The process according to claim 9, wherein the user-specific text, the PIN or the code word or similar identifier is entered by enunciation.

12. The process according to claim 1, further comprising executing the process automatically in quasi real time.

13. A digital process for authentication of a user of a database for access to protected data or a service reserved for a defined circle of users or for the use of data currently entered by the user, comprising routing a voice sample currently enunciated during an access attempt by the user to a voice analysis unit, computing a current voice profile and comparing the current voice profile in a voice profile comparison unit against a previously stored initial voice profile and, in response to a positive comparison result, authenticating the user and enabling access with a first control signal, but in response to a negative comparison result disabling access with a second control signal or triggering the generating of a substitute authentication procedure, and in the assessment and decision-making step, evaluating a scope of the voice material available on determination of the initial voice profile in such a way that the assessment of the text-independent verification process becomes better as the scope of the voice material increases.

14. An arrangement for realization of an authentication procedure for a user of a database for access to protected data or a service reserved for a defined circle of users or for the use of data currently entered by the user, comprising a system server for carrying out the authentication procedure, wherein the system server is assigned a voice sample interface for receipt of voice samples and further comprises a voice analysis unit connected to the system server, a voice profile storage unit and a voice profile comparator unit connected to the voice analysis unit and the voice profile storage unit for comparison of a previously stored initial voice profile against a currently determined voice profile and for output of a first or second control signal depending on a comparison result, and wherein the voice profile comparison unit is designed for parallel or sequential determination of a text-dependent first intermediate result and a text-independent second intermediate result and an assessment and decision-making stage is designed for evaluation and logical combination of the two intermediate results, which outputs the first or second control signal.

15. The arrangement according to claim 14, wherein the system server comprises a text evaluation unit for evaluation of user-entered text, a PIN or similar identifier, a text storage unit for storage of test or a PIN or similar identifier, and a text comparator unit for comparison of currently entered text with spoken text, a PIN, or similar identifier, and for output of the first and second control signals depending on the comparison result.

16. The arrangement according to claim 14, wherein the system server comprises a user prompting unit for realization of at least one of visual or audible user prompt, to request a voice sample or to prompt the user to enter a PIN or a code word or similar identifier.

17. The arrangement according to claim 14, wherein the system server is in a protected connection during and/or directly after completion of the authentication procedure with a control input of a data management server on which protected data or documents are stored, or with a control input of a service server via which services reserved for a defined circle of users can be accessed or generated.

18. An arrangement for realization of an authentication procedure for a user of a database for access to protected data or a service reserved for a defined circle of users or for the use of data currently entered by the user, comprising a system server for carrying out the authentication procedure, wherein the system server is assigned a voice sample interface for receipt of voice samples and further comprises a voice analysis unit connected to the system server, a voice profile storage unit and a voice profile comparator unit connected to the voice analysis unit and the voice profile storage unit for comparison of a previously stored initial voice profile against a currently determined voice profile and for output of a first or second control signal, and the system server comprises a recording unit for text enunciated for determination of the initial voice profile, which is connected at an output end to a text scope evaluation unit of the assessment and decision-making stage of the voice profile comparator unit in such a way that an output signal characterizing the scope of the text is included as an input signal in evaluation of the intermediate results.

* * * * *